United States Patent [19]
Pereda

[11] 3,852,994
[45] Dec. 10, 1974

[54] SLOT ANTENNA APPARATUS FOR MEASURING THE DETONATION OF AN EXPLOSIVE MATERIAL

[76] Inventor: Eugene F. Pereda, 11621 Hughes Ave. N.E., Albuquerque, N. Mex. 87112

[22] Filed: Jan. 2, 1974

[21] Appl. No.: 430,353

[52] U.S. Cl.................................... 73/35, 343/767
[51] Int. Cl.............................................. C01l 5/14
[58] Field of Search ............... 324/183; 73/35, 167; 343/767, 770

[56] References Cited
UNITED STATES PATENTS
3,528,280   9/1970   Ciccone.................................. 73/35

Primary Examiner—Eli Lieberman
Attorney, Agent, or Firm—R. S. Sciascia; P. N. Critchlow

[57] ABSTRACT

An elongate cylindrical tube is provided with a pair of longitudinally-spaced slots forming a slot antenna capable of producing a signal at each slot in response to the electromagnetic radiation component of a detonation wave travelling within the tube. A polarizing and integrating circuit applies the signal of each slot to the 'time-base' trace of an oscilloscope to provide a recording of the time required for a detonation wave produced in the tube to travel the distance between the spaced slots. Dielectric material can be used to adjust the slot size to the frequency of the electromagnetic radiation component.

7 Claims, 3 Drawing Figures

PATENTED DEC 10 1974

3,852,994

SLOT ANTENNA APPARATUS FOR MEASURING THE DETONATION OF AN EXPLOSIVE MATERIAL

BACKGROUND OF THE INVENTION

The invention described herein may be manufactured and used by or for the Government of the United States for governmental purposes without the payment of any royalties thereon or therefore.

The present invention relates to the measurement of detonation velocity of explosives and, in particular, to electronic means for obtaining the velocity measurements.

There is a need particularly in the ordnance field for an accurate, inexpensive, safe and reusable instrument capable of measuring the detonation velocity of explosive materials. Various mechanical and electronic devices have been attempted and, although they are being used, they nevertheless display certain disadvantages such as the fact that they are quite complicated, expensive or, with regard to the mechanical device, quite slow and unnecessarily complex. One particular velocity-measuring technique is the so-called d'Autriche method which has been used with some success although again the accuracy of this particular method is somewhat questionable and its use involves unnecessary time, effort and expenses. In particular, the d'Autriche method employs a cylinder in which the explosive can be mounted and detonated to produce the desired detonation wave travelling longitudinally inside the cylinder. The electromagnetic radiation component of the travelling detonation wave is picked up by spaced copper finger antennaes and the time interval between the spaced pickups is employed to provide the velocity measurement. One particular difficulty with this testing procedure is that the copper finger antennaes which provide the pickup are destroyed by the explosive force of each test and must be replaced for successive tests. The method also is not as reliable as could be desired since the signals produced are subject to error which, of course, is reflected in the velocity determinations. Further, the d'Autriche apparatus is relatively fixed to the extent that it cannot be finely tuned to provide a clear maximum signal for the received wavelengths.

The present invention basically is an improvement of the d'Autriche apparatus, the improvement residing in the use of the cylinder as a slot antenna rather than the destructible copper finger antennaes of the d'Autriche cylinder. Other features of the present apparatus will be described in detail in the ensuing description.

OBJECTS OF THE INVENTION

A fundamental object of the present invention is to provide an inexpensive, simple, accurate and reusable apparatus for providing detonation wave velocity measurements.

A more specific object, as well as a feature of the invention, is to utilize slot antenna principles in the test apparatus for measuring the detonation wave velocity and, in conjunction with this object, to provide an apparatus that is tunable as well as reliable in its operation.

Other objects and their attendant advantages will become more apparent in the following description.

BRIEF DESCRIPTION OF THE DRAWINGS

The present information is illustrated in the accompanying drawings of which

DETAILED DESCRIPTION OF THE INVENTION

Figure 1:
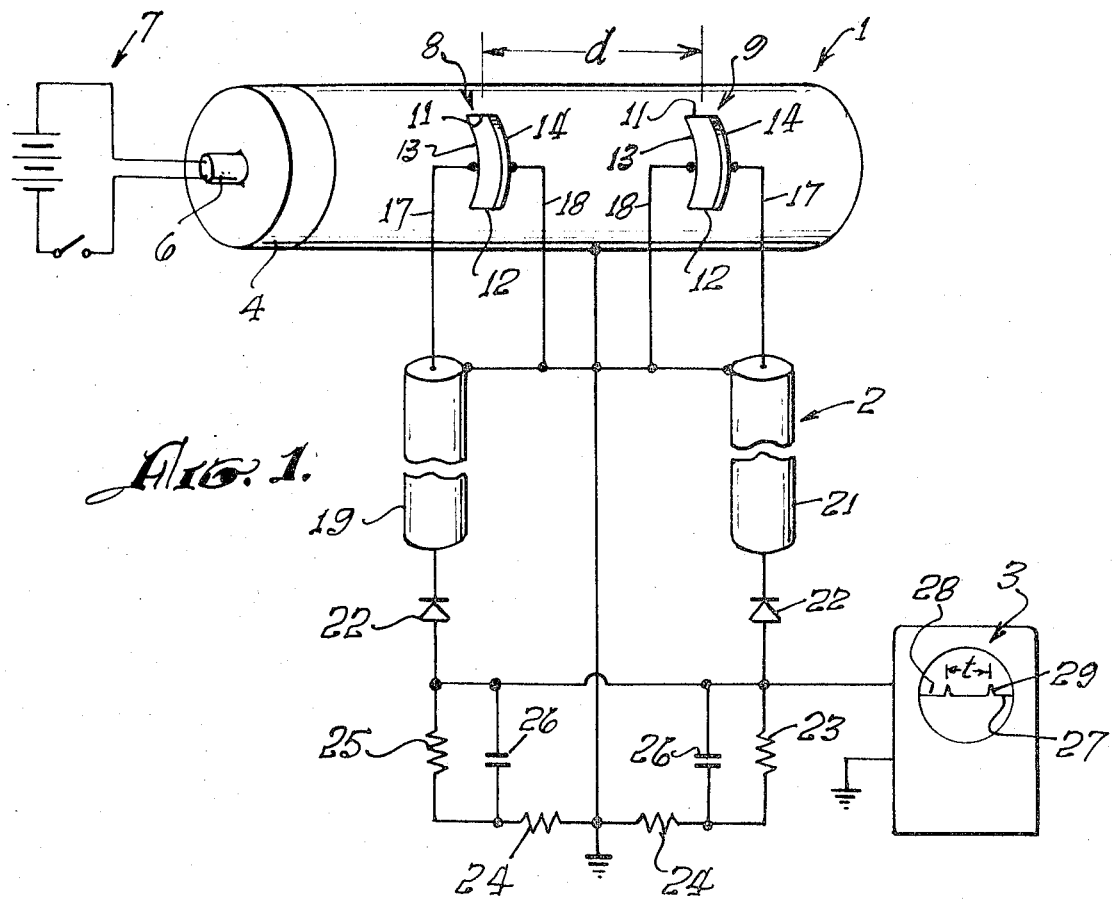
FIG. 1 is a schematic illustration of the cylindrical slot antenna and the electrical circuit used to apply the antenna signal to an oscilloscope display.
Figure 2:
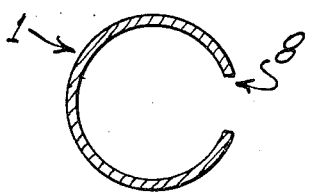
FIG. 2 is a section along the lines 2—2 of FIG. 1.

Referring to FIG. 1, the apparatus of the present invention includes as its principle components, a cylindrical tube 1, an oscilloscope 3 and electronic circuit means 2 coupling the signals produced within the tube to the oscilloscope. Tube 1 is a hollow metallic cylinder formed, for example, of titanium steel having a cylindrical wall thickness of about one-half inch. A protective end cap 4 is threadably mounted on one end of the cylinder while the other end is left open to permit the escape of the explosive gases which otherwise might damage or burst the cylinder. An explosive material (not shown) is mounted in the closed end 4 of the cylinder which, of course, is specifically formed to receive the explosive. Detonation of the explosive is achieved in the conventional manner by the use of the detonator 6 triggered by a battery and switch circuit 7 although, as should be apparent, the detonation of the explosion can be accomplished in any desired manner.

The principle feature of the invention is the formation of tube 1 into a slot antenna capable of picking up the electromagnetic radiation component or, in other words, the radio frequency component present in the detonation wave produced when the explosive is detonated. Insofar as the present invention is concerned, the particular configuration of the slotted antenna is a matter of choice which obviously will depend upon the particular test conditions and procedures which are to be followed. As shown, tube 1 is provided with a pair of spaced slots 8 and 9, each of these slots extending normal to or, at least, transversely crossing the longitudinal axis of tube 1. Each of the slots also includes end walls 11 and 12 and side walls 13 and 14. Further, the slots are spaced longitudinally of the tube one from the other a fixed and known distance represented in FIG. 1 by letter $d$. A detonation wave produced by the explosive obviously is constrained to travel lengthwise of the tube so as to escape from its open end and, of course, in its travel, it passes each of the slots successively. The time required for the wave to travel distance $d$ manifestly provides a measurement of the velocity of travel of the detonation wave.

Figure 3:
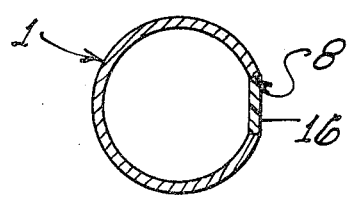
FIG. 3 is a view similar to FIG. 2 showing a preferred modification.

As has been stated, the particular configuration of slots 8 and 9 is a matter of choice and the configuration shown in FIG. 1 is provided principally for illustrative purposes. Slot antennaes are quite well known in the antenna art and the principles applicable to them are described in numerous publications. For example, a theoretical analysis of this type of antenna is disclosed in Chapter 5 of "Antenna Analysis" by Edward A. Wolff, published by John Wiley and Sons, 1966. Further, U.S. Pat. No. 3,577,196 "Rollable Slot Antenna" issued May 4, 1971, to Eugene F. Pereda, further describes in some detail particular slot antennaes and discusses to some extent the dimensioning of the slots of these antennaes relative to the operating band for which they are used. In particular, slots 8 and 9, as shown in FIG. 1 are considered to be driven elements and, if needed, other parasitic elements such as those described in the identified U.S. Patent can be employed to serve as director and reflector slots. In general, it is assumed that the slot antenna principles described in the publications which have been cited, as well as other publications, are sufficiently well known to permit an antenna configuration capable of maximizing the response and providing a clear and accurate signal capable of being displayed on oscilloscope 3. However, because the present slot antenna is intended to pick up radio frequency waves present in a detonation wave, it is desirable to reduce the slot size to accommodate the wave lengths of the detonation frequencies. Since these radio frequencies of the detonation wave are in the megahertz range, performance of the antenna can be improved by filling antenna slots 8 and 9 with a ceramic dielectric material, such as porcelain in the manner illustrated in FIG. 3 where it will be seen that slot 8 is filled with dielectric material 16. Use of the dielectric material decreases the effective size of the slot by application of the well known law of propagation velocity in the medium and, preferably the size of the slots and the dielectric material used in the slots is selected so as to provide a half-wave length size at the anticipated radio frequency. Usually, the slots are made as small as possible and the dielectric filling should have the highest dielectric constant possible. It also should be recognized that tube 1 can be provided with more than one pair of slots and that the additional pairs of slots used in the tube can vary in size and in their dielectric so as to be tuned to different radio frequencies.

As already has been indicated, the signals generated by slots 8 and 9 of tube 1 are applied to oscilloscope 3 through electronic circuit 2. In particular, the radio frequency signals produced by the detonation are picked up by circuit input leads 17 and 18, these leads being disposed in electrically-conductive contact with walls 13 and 14 of each of the slots. Preferably, the pickup is made at the midpoint at each of the slots. The input leads of each of the slots are coupled to coaxial cables 19 and 21. As shown, leads 17 each connect to the inner conductor of the cables while leads 18 connect to the braid or outside of these coaxial cables. Since, in the present instance the display is made by means of an oscilloscope 3, it is desired that the signals applied to the oscilloscope have a single polarity. To accomplish this purpose, the output of the coaxial cables is conducted through diodes 22 the output of which is applied to an integration network formed by resistors 23 and 24 and capacitor 26. Most suitably, resistors 24 also serve as an impedance matching components to minimize electrical reflections which otherwise might degrade the oscilloscope display.

Oscilloscope is conventional in that it is of a type having its horizontal trace 27 forming a 'time-base' on which the signal fluctuations produced by each of the slots will appear as conventional pips 28 and 29. Obviously, the time required for the detonation wave to travel distance $d$ or, in other words, the distance between slots 8 and 9, is represented by the distance on horizontal trace 27 between pips 28 and 29, this distance being shown in FIG. 1 as distance $t$. Velocity measurements, of course, are provided by using time data $t$ to measure the time required for the wave to travel a distance $d$.

An instrument of the type which has been described possesses a number of distinct advantages over other related detonation velocity instruments. Thus, it is unusually simple and inexpensive both to manufacture and to use. Also, it is capable of providing relatively more accurate and reliable velocity information. In particular, the present instrument is a significant improvement over the d'Autriche apparatus since the present instrument is reusable whereas the d'Autriche instrument required replacement of the antennaes after each use. As to accuracy and signal strength, the principles applicable to slot antennaes are considered to be sufficiently well known to maximize the performance of the present antenna and permit relatively better performance. One possible operating problem which may be experienced in using the present antenna arises from the fact that the contacts of leads 17 and 18 at the midpoints of the slot walls are exposed to the explosive blast. As a result the blast can produce a so-called desoldering due to the heat of the explosion. This difficulty, however, easily can be resolved by employing a particular capacitive coupling means described in my U.S. Pat. No. 3,757,344 "Slot Antenna Having Coupling Means" issued Sept. 4, 1973.

Obviously many modifications and variations of the present invention are possible in the light of the above teachings. It is therefore to be understood that within the scope of the appended claims the invention may be practiced otherwise than as specifically described.

I claim:

1. Apparatus for measuring the detonation velocity of an explosive material comprising:
    an elongate metallic tube closed at one of its ends and open at the other, said tube being provided with at least a pair of transversely-disposed slots spaced a fixed distance longitudinally of the tube,
    means provided at said closed end for mounting explosive material,
    means for detonating said material to produce a detonation wave travelling lengthwise within the tube,
    each slot of said tube being capable of converting electromagnetic radiation present in said travelling detonation wave into an electrical signal output,
    means for displaying said signal outputs and,
    circuit means conductively coupling each of said slots to said display means,
    the time required for said detonation wave to travel the fixed distance between said slots being ascertainable from said display means whereby the velocity of said travelling detonation wave can be determined.

2. The apparatus of claim 1 wherein said slots are filled with a dielectric material for adjusting the slot size to the anticipated wave length of said detonation wave electromagnetic radiation.

3. The apparatus of claim 1 wherein said circuit means includes input leads conductively contacting each transverse side wall of each of said pair of slots.

4. The apparatus of claim 3 wherein said display means is an oscilloscope having a horizontal trace providing a time-base for said travelling detonation wave, said circuit means further including polarity-control means for applying circuit output signals of a single polarity to said oscilloscope horizontal trace.

5. The apparatus of claim 3 wherein said tube is cylindrical and said transverse slots are disposed normal to the longitudinal axis of said cylinder.

6. The apparatus of claim 5 wherein said input leads contact said transverse slots at their midpoints.

7. The apparatus of claim 5 wherein said circuit means further includes integrating means for said circuit inputs.

* * * * *